(12) United States Patent
Liu et al.

(10) Patent No.: US 7,788,198 B2
(45) Date of Patent: Aug. 31, 2010

(54) METHOD FOR DETECTING ANOMALIES IN SERVER BEHAVIOR USING OPERATIONAL PERFORMANCE AND FAILURE MODE MONITORING COUNTERS

(75) Inventors: Yaodong Liu, Redmond, WA (US);
Cary L. Mitchell, Renton, WA (US);
John Dunagan, Bellevue, WA (US);
Dana K. Fujimoto, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 11/610,987

(22) Filed: Dec. 14, 2006

(65) Prior Publication Data
US 2008/0148180 A1    Jun. 19, 2008

(51) Int. Cl.
G06F 17/00 (2006.01)
G06F 15/00 (2006.01)
(52) U.S. Cl. .............................. 706/45; 706/47; 706/48
(58) Field of Classification Search ........................ None
See application file for complete search history.

(56) References Cited

U.S. PATENT DOCUMENTS

| | | |
|---|---|---|
| 6,584,569 B2 | 6/2003 | Reshef et al. |
| 6,889,218 B1 | 5/2005 | Nassehi |
| 6,983,317 B1 | 1/2006 | Bishop et al. |
| 7,111,204 B1 | 9/2006 | Couturier et al. |
| 2003/0037136 A1 | 2/2003 | Labovitz et al. |
| 2004/0181664 A1 | 9/2004 | Hoefelmeyer et al. |
| 2005/0039086 A1 | 2/2005 | Krishnamurthy et al. |
| 2005/0289395 A1 | 12/2005 | Katsuyama et al. |
| 2006/0010389 A1 | 1/2006 | Rooney et al. |
| 2006/0206615 A1 | 9/2006 | Zheng et al. |

OTHER PUBLICATIONS

Gross et al., K., "Early Detection of Signal and Process Anomalies in Enterprise Computing Systems", 2002.*
Wang et al., Y., "STRIDER: A Black-box, State-based Approach to Change and Configuration Management and Support", 2003.*
Fei, L., "A Real-Time Anomaly Detection Approach Toward Detection of Denial of Service Attacks in Computer Networks", 2002.*
Lee et al., "Data Mining Approaches for Intrusion Detection", 1998.*
Barbara et al., "Detecting Novel Network Intrusions Using Bayes Estimators", 2001.*
Mellia et al., "Passive Identification and Analysis of TCP Anomlies", 2006.*

(Continued)

*Primary Examiner*—Donald Sparks
*Assistant Examiner*—Adrian L Kennedy
(74) *Attorney, Agent, or Firm*—Lee & Hayes, PLLC

(57) ABSTRACT

A strategy is described for detecting anomalies in the operation of a data processing environment. The strategy relies on parameter information to detect the anomalies in a detection operation, the parameter information being derived in a training operation. The parameter information is selected such that the detection of anomalies is governed by both a desired degree of sensitivity (determining how inclusive the detection operation is in defining anomalies) and responsiveness (determining how quickly the detection operation reports the anomalies). The detection operation includes specific algorithms for determining undesired trending and spiking in the performance data.

18 Claims, 6 Drawing Sheets

OTHER PUBLICATIONS

Candea, et al., "JAGR: An Autonomous Self-Recovering Application Server," Proceedings of the Autonomic Computing Workshop Fifth Annual International Workshop on Active Middleware Services (AMS'03), 2003, available at <<http://ieeexplore.ieee.org/iel5/8595/27234/01210217.pdf?tp=&arnumber=1210217&isnumber=27234>>, 10 pages.

Guitart, et al,, "Tuning Dynamic Web Applications Using Fine-Grain Analysis," Proceedings of the 13th Euromicro Conference on Parallel, Distributed and Network-Based Processing (Euromicro-PDP'05), 2005, available at <<http://ieeexplore.ieee.org/iel5/9521/30169/01386046.pdf?tp=&arnumber=1386046&isnumber=30169>>, 8 pages.

Roblee, et al., "Implementing Large-Scale Autonomic Server Monitoring Using Process Query Systems," Proceedings of the Second International Conference on Autonomic Computing (ICAC'05), 2005, available at <<http://ieeexplore.ieee.org/iel5/10030/32175/01498058.pdf?tp=&arnumber=1498058&isnumber=32175>>, 11 pages.

Thakur, et al., "Analyze-NOW-An Environment for Collection and Analysis of Failures in a Network of Workstations," IEEE Transactions on Reliability, vol. 45, No. 4, Dec. 1996, available at <<http://ieeexplore.ieee.org/iel1/24/12134/00556579.pdf?tp=&arnumber=556579&isnumber=12134>>, pp. 561-570.

* cited by examiner

METHOD FOR DETECTING ANOMALIES IN SERVER BEHAVIOR USING OPERATIONAL PERFORMANCE AND FAILURE MODE MONITORING COUNTERS

BACKGROUND

An administrator of a data processing environment will attempt to ensure that the environment provides substantially error-free services to users. To this end, an administrator may manually examine various performance logs generated by the data processing environment to determine whether the data contained therein reveals any type of performance anomaly. If such an anomaly is present, the administrator can then take corrective action to eliminate or reduce the effects of the anomaly.

Nevertheless, the analysis performed by a human administrator may have various shortcomings. A typical data processing environment (such as a data center) may include many server machines and other processing equipment. These machines may potentially generate a large quantity of performance data. An administrator may find the task of manually examining this large amount of performance data to be both tedious and error-prone. That is, an administrator may be deluged by the large amount of performance data, potentially preventing the administrator from detecting and timely acting on telltale signs of impending failure in the data processing environment.

Numerous tools exist to assist an administrator in diagnosing failures in various types of data processing environments. However, as appreciated by the present inventors, these tools may fail to adequately relieve the burden placed on the administrator. In one such instance, a tool may rely on one or more alarm thresholds to detect the occurrence of anomalies. Selecting alarm threshold levels is not an intuitive exercise, and thus, an administrator may have difficultly selecting appropriate thresholds. As a result, the administrator may select thresholds that are too low or two high, resulting in the under-reporting or the over-reporting of anomalies. The tools may allow the administrator to adjust the threshold levels on an ad hoc basis, but this iterative correction processing may be both tedious and error-prone.

SUMMARY

According to one illustrative implementation, a strategy is described for detecting anomalies in a data processing environment, such as, but not limited to, a data center or like environment including a plurality of server machines. The strategy includes a training operation and an anomaly detection operation. The training operation derives parameter information based on training performance data and the manual classification of such data by a human user. The detection operation detects the presence of anomalies in operational performance data based on the parameter information derived in the training operation. The parameter information is automatically selected such that the detection of anomalies is governed by both a desired degree of sensitivity (determining how inclusive the detection operation is in defining anomalies) and responsiveness (determining how quickly the detection operation reports the anomalies). In detecting anomalies, the strategy relies on various algorithms for determining undesired trending and spiking in the operational performance data. The strategy can present the output of its analysis in various forms, such as in graphical form.

According to one exemplary benefit, by virtue of the selection of parameters based on both sensitivity and responsiveness, a user is likely to be presented with alarms which duly emphasize significant problems on a timely basis. This allows the user to take action based on the most serious problems in the data processing environment, without being deluged with lower-level issues, and without having to manually and repetitively adjust alarm threshold levels in an ad hoc manner.

Additional exemplary implementations and attendant benefits are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for identifying and mitigating anomalies in a data processing environment. The strategy can be manifested in various systems, apparatuses, components, procedures, storage mediums, data structures, and other forms.

This disclosure includes the following sections. Section A describes an exemplary system for identifying and mitigating anomalies within a data processing environment. Section B describes exemplary procedures that explain the operation of the system of Section A.

A. Exemplary System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overeview of an Exemplary System for Analyzing Anomalies

Figure 1:
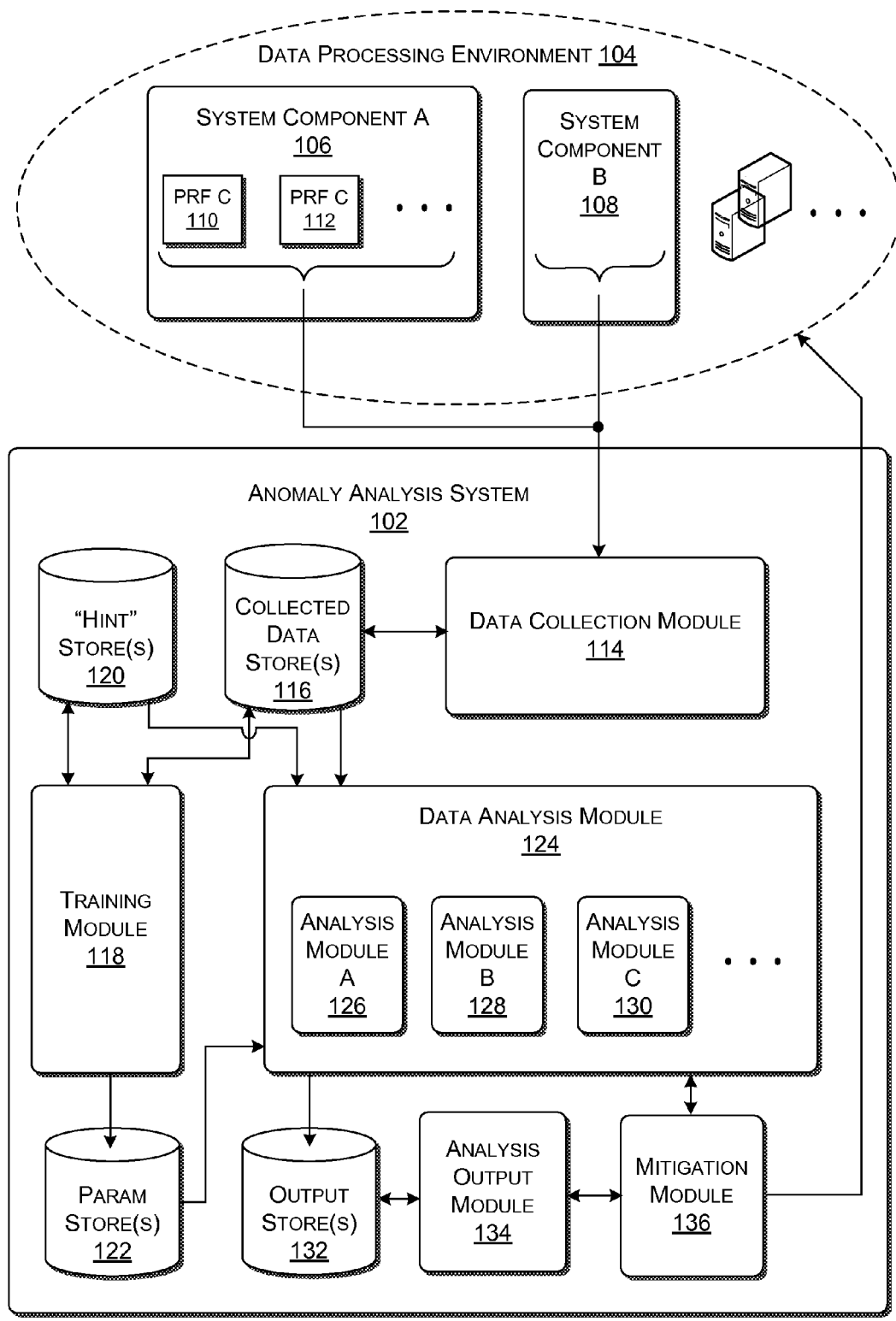
FIG. 1 shows an exemplary anomaly analysis system for detecting anomalies in a data processing environment.

FIG. 1 shows an exemplary anomaly analysis system (AAS) 102 for detecting anomalies in the performance of a data processing environment 104. To begin with, the data processing environment 104 can include any collection of components (106, 108, . . . ) for performing any role or combination of roles in any context. In one exemplary case, the data processing environment 104 can include a plurality of computer server machines which provide service to a group of users. For example, the server machines may provide a network-accessible service to members of an organization, to members of the public at large, and so forth. One or more networks (not shown) may communicatively couple the components of the data processing environment 104 together and also allow users to interact with the components.

The data processing environment 104 can include a plurality of performance monitoring mechanisms. As the name suggests, these performance monitoring mechanisms monitor the performance of various aspects of the data processing environment 104. By way of illustration and not limitation, the performance monitoring mechanisms can include performance counters. The performance counters record events that reflect how well the data processing environment 104 is performing.

Each component may include a plurality of performance counters associated therewith. For example, component A 106 includes a plurality of performance counters (110, 112, . . . ) associated therewith. The data processing environment 104 may also devote one or more performance counters to individual applications that run on a component. In another case, the data processing environment 104 can include other performance counters that are not associated with any one component. For example, the data processing environment 104 may include a plurality of performance counters which record events associated with the performance of the data processing environment 104 considered as a whole.

Different types of performance counters can record different kinds of events. A first kind of performance counter can record an amount of memory that is being consumed. A second kind of performance counter can record an amount of processing (e.g., CPU) resources that are being consumed. A third kind of performance counter can record a degree of latency associated with certain operations performed by the data processing environment 104. A fourth type of performance can record certain types of signals, exceptions or messages generated by the data processing environment 104, and so forth. No limitation is placed on the types of performance counters that can be incorporated in the data processing environment 104. In any event, the various data generated by the collection of performance counters is referred to for convenience as "performance data" herein.

Now turning to the anomaly analysis system (AAS) 102, the purpose of this system 102 is to receive performance data from the data processing environment 104 and to detect anomalies based on the performance data, in conjunction with "hint information." As will be described further below, the hint information identifies the type of counters producing the performance data, which, in turn, identifies the type of behavior considered normal and abnormal for the counters. By way of overview, the AAS 102 includes two operational modes or phases. In a training phase, the AAS 102 receives training performance data from the data processing environment 104, manually annotates this data to mark instances where this data reveals the presence of anomalies, and then automatically generates parameter information based on the training performance data, manual annotations, and hint information. An administrator may also optionally update the hint information at this time. In a detection phase, the AAS 102 examines operational performance data based on the parameter information derived in the training phase and the hint information. The detection phase provides an indication of whether the operational performance data reflects the presence of anomalies.

The AAS 102 includes a number of modules to function as described above. These modules are enumerated and explained below.

A data collection module 114 collects performance data from the data processing environment 104. As explained above, the performance data may originate from any kind of performance monitoring mechanism, such as a collection of performance counters. In one implementation, the performance counters can proactively forward their data to the data collection module 114, e.g., on a periodic basis or in response to some other kind of triggering event (such as the logging of a prescribed amount of data). In another case, the data collection module 114 can poll the performance counters to collect the performance data. In other words, the data collection module 114 can collect performance data using either a "push" or "pull" model of data collection (or some combination thereof). The data collection module 114 may store the collected data in one or more collected data stores 116. These stores 116 may comprise any type of structured storage mechanisms (e.g., Structured Query Language storage mechanisms) or "flat" storage mechanisms, implemented at a single location or plural locations.

A training module 118 acts on the data in the collected data stores 116. In the training phase, the performance data is used to help train the AAS 102 by deriving parameter information used by the detection phase. Hence, to facilitate reference, the performance data acted on by the training module 118 is referred to as "training performance data." In contrast, the performance data acted on in the detection phase is referred to as "operational performance data," indicating that this data reflects the normal operation of the data processing environment 104. In one case, an administrator (or other appropriately authorized user) can purposely select training performance data that is known to represent anomalous performance of the data processing environment 104.

In the training phase, an administrator or other person of suitable expertise manually examines the training performance data. Based on this examination, the administrator manually annotates the data to identify instances of anomalous behavior. The annotations provided by the administrator can be stored back in the collected data stores 116, along with the original training performance data. The annotations identify the presence of anomalies.

Different types of performance counters may exhibit different types of anomalies (depending on the respective mechanisms that these counters are monitoring). In connection therewith, the AAS 102 also stores hint information in one or more hint stores 120. As mentioned above, the hint information identifies the types of performance counters within the data processing environment 104 and the failure modes associated with these counters, thereby establishing a context to the performance data generated by the performance counters. For example, the hint information can identify that spiking is the kind of anomaly that is exhibited by CPU style counters, trending is the kind of anomaly that is exhibited by memory style counters, and so forth. The hint stores 120 can index the hint information in various ways that allow the hint information to be associated with particular counters, and hence, with particular performance data generated by the counters. For instance, the hint stores 120 can index the hint information by providing counter name information, and so on. As part of the training phase, an administrator may add to or modify hint information as deemed appropriate.

In a next part of the training phase, the training module 118 can automatically analyze the training performance data in conjunction with the human assessments made the administrator and the hint information. The general purpose of this process is to derive one or more parameters. These parameters are generally referred to as parameter information herein.

By way of general overview, the training module 118 derives the parameter information by selecting one or more parameters which allow one or more detection algorithms (in the detection phase) to duplicate as closely as possible the human judgment of the administrator. This defines a sensitivity component of the analysis. Moreover, the training module 118 selects the parameters to produce a desired level of responsiveness. The sensitivity component of the detection refers to how inclusive the AAS 102 is when detecting anomalies. That is, it is desirable to select parameters that allow the AAS 102 to detect significant errors that may cause serious disruption in service provided by the data processing environment 104, while not deluging the administrator with too many less significant errors (that potentially represent issues that may resolve without special intervention). The responsiveness component of the detection refers to how timely the AAS 102 responds to errors. It is desirable to report significant errors as soon as possible, but not so soon as to interfere with meaningful analysis of the performance data. The examples to follow will provide additional detail regarding how the training module 118 derives the parameter information. The training module 118 can store the parameter information in one or more parameter stores (e.g., structured storage or flat files) 122.

In one case, the training module 118 operates substantially automatically in deriving the parameter information, e.g., without substantial interaction with the administrator. In another case, an administrator can manually supplement the analysis provided by the training module 118. For instance, an administrator can modify the parameter information derived by the training module 118, e.g., by changing existing parameter information, adding new types of parameter information, and so on. The administrator can make these changes based on his or her expert knowledge of the behavior of a particular data processing environment, including the types of failures associated with such an environment. Through these changes, the administrator can account for problems that may not be adequately represented in the training performance data. Manual intervention can take the form of directly adjusting parameter information generated by the training module 118 and/or manually adjusting the performance data that is fed into the training module 118, and/or by some other form of modification.

In the detection phase, a data analysis module 124 receives operational performance data from the collected data stores 116. This performance data is collected from the performance counters during the normal operation of the data processing environment 104. In one case, such "normal" operation occurs during the testing of the environment 104 prior to formal deployment. In another case, the normal operation occurs after deployment, when the data processing environment 104 is being used in its intended manner. There are no preconceptions regarding the operational performance data; this data may or may not reveal the presence of anomalies.

The purpose of the data analysis module 124 is to use the parameter information (derived by the training module 118 in the training phase) to determine whether the operational performance data is anomalous. To this end, the data analysis component 124 can rely on various analysis modules (126, 128, 130, . . . ). The analysis modules (126, 128, 130, . . . ) can use different respective algorithms to analyze the operational performance data. In one implementation, the data analysis module 124 also receives hint information from the hint store 120. The hint information identifies salient information regarding the performance counters involved in generating the operational performance data. For instance, the hint information identifies the type of performance counters and their associated failure modes. Based on this hint information, the data analysis module 124 can select analysis modules (126, 128, 130, . . . ) that are best suited for analyzing specific types of operational performance data. The next subsection provides additional information regarding exemplary types of analysis modules (126, 128, 130, . . . ) that can be used by the data analysis module 124. The data analysis module 124 can store its detection results in one or more output stores (e.g., structured storage or flat files) 132.

An analysis output module 134 provides the output results to a user in various formats. In one case, the analysis output module 134 can display the output results in graphical form (as discussed more fully in a later subsection). In another case, the analysis output module 134 can display the output results in tabular form, audible form, or some other form, or any various combinations thereof.

In one application, a human administrator can manually review the output of the analysis output module 134 to make a judgment as to whether there are problems in the data processing environment 104. In another case, the analysis output module 134 can incorporate routines that automatically examine the results of the data analysis module 124 and draw automated conclusions regarding the presence of problems in the data processing environment 104. The automated routines can rely on a rules database (not shown) and/or other tools and algorithms to derive its conclusions. In another case, the analysis output module 134 can provide a collection of services that rely on both human judgment and automated routines.

Finally, the AAS 102 can include a mitigation module 136. The mitigation module 136 can provide one or more tools that allow an administrator to take corrective action in the data processing environment 104 to eliminate or reduce the severity of any anomalies revealed by the data analysis module 124. In one case, the mitigation module 136 can apply prescribed rules based on prior experience in addressing the anomalies. Such rules may have the structure: if a known anomaly pattern X is observed, then take corrective steps L, M, and N, etc. to address it. The mitigation module 136 can rely on manual operations to identify and implement remedies, automated operations, or some combination of manual and automated operations.

In one particular case, the mitigation module 136 can take action in response to each detected instance of an anomaly. In another case, the mitigation module 136 can take action in response to repeated occurrences of anomalous behavior (thereby ignoring one or more instances of anomalous behavior). For example, the mitigation module 136 can take action if prescribed behavior happens on X percent of components and/or if the behavior happens Y times per scan interval, and so on.

In terms of physical implementation, the AAS 102 can represent a code program or fixed logic circuitry (or some combination thereof) that can run on one or more computer machines. For example, an administrator or other suitably authorized user within an organization can operate the AAS 102 on a computer workstation that is specifically devoted to the task of anomaly detection, or on a general purpose computer of any type. The AAS 102 can be communicatively coupled to the data processing environment 104 through any kind of network or combination of networks. This communicative coupling allows the AAS 102 to receive data from the data processing environment 104 and to optionally implement changes within the data processing environment 104. Alternatively, or in addition, a user can manually make changes within the data processing environment 104 based on analysis and recommendations generated by the AAS 102.

In another application, the AAS 102 can be configured to operate in a substantially automatic fashion, receiving performance data, detecting anomalies, and optionally taking corrective action. For instance, the AAS 102 can perform its analysis at periodic intervals or in response to other triggering events or in response to prescribed combinations of triggering events.

A.2. Exemplary Analysis Modules

As explained above, the data analysis module 124 can rely on a suite of analysis modules (126, 128, 130, . . . ) to analyze the performance data. More specifically, the data analysis module 124 can apply different types of analysis modules (126, 128, 130, . . . ) to best suit different types of performance counters (where the hint information can be used to, in turn, identify the different types of performance counters). The different types of analysis modules (126, 128, 130, . . . ) can use different types of detection algorithms to perform their respective analyses.

Figure 2:
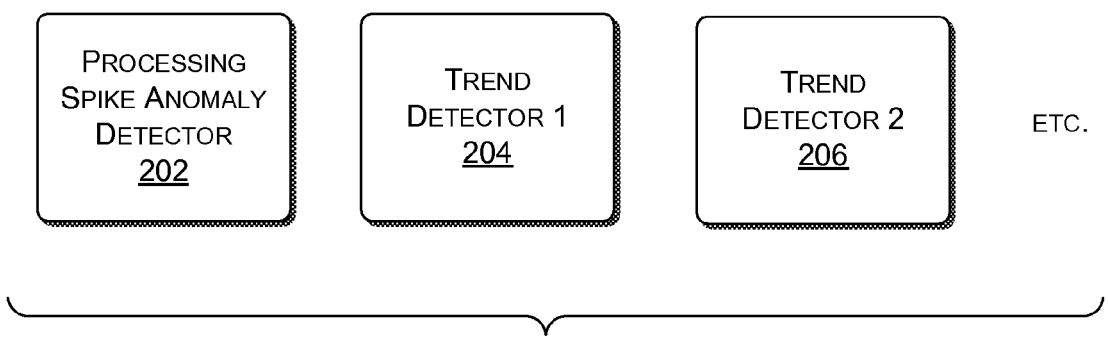
FIG. 2 shows a series of exemplary detection modules that can be used in the anomaly analysis system of FIG. 1.

FIG. 2 shows three exemplary analysis modules. A first analysis module 202 detects undesirable temporary deviations (e.g., spikes) in the performance of a component (e.g., a processing device, etc.). In other words, this type of module identifies whether any type of component is suddenly asked to perform a large amount of work. A second analysis module 204 detects undesirable sustained deviations from a constant state in the performance of a component (e.g., a memory device, etc.). In other words, this type of detector identifies any deviation from a "flat" performance state associated with any type of component. A third analysis module 206 detects undesired deviations from a preferred non-zero rate of trending in the performance of a component. This type of detector is appropriate for components that exhibit behavior that is normally increasing or decreasing at a prescribed rate, but that deviations from this prescribed rate may reveal an error in operation. For instance, this type of detector can apply to a counter or combination of counters which register a number of actions successfully completed by a component or a combination of components; in this case, the number of successfully completed actions is expected to increase, but increases that are too high or too low may be indicative of errors.

In one mode of operation, each of these modules (202, 204, 206, . . . ) can act in real time on performance data that is concurrently being produced by the data processing environment 104. In other words, the analysis modules (202, 204, 206, . . . ) can act in a streaming fashion on performance data generated in a time interval of t-n, where t represents a current point in time and t-n represents the last n amount of time that has just transpired (e.g., the last 10 second, the last 10 minutes, and so forth).

Figure 3:
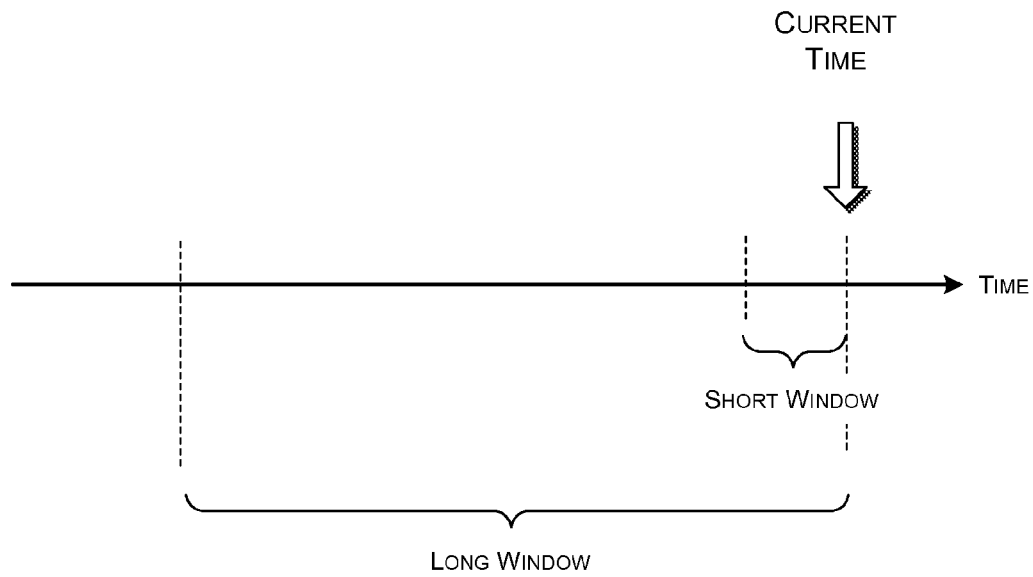
FIG. 3 shows the selection of a short window and a long window for use in one or more of the detection modules of FIG. 2.

Numerous different algorithms can be used to perform the above-described analyses. Consider first the case of CPU spiking. With reference to FIG. 3, the first analysis module 202 can detect a CPU spiking event by computing a first average over a relatively short window (e.g., 10 seconds) and a second average over a longer window (e.g., 10 minutes). The first analysis module 202 can then compare the first average to the second average. If these two averages differ by more than a prescribed amount, then the analysis module 202 can record the presence of a possible anomaly. One way of performing this comparison operation is to form a ratio of the first and second averages, and then compare this ratio to a prescribed threshold.

This CPU-spiking example also serves as an opportunity to more fully describe the training that can be performed by the training module 118. The first analysis module 202 uses at least three parameters to perform its computations: a size of the short window; a size of the long window; and a threshold used to determine whether there is an anomaly. The training module 118 can compute one or more of these parameters to achieve a desired result in the detection phase. More specifically, the training module 118 can compute the parameters to satisfy the following exemplary goals: (a) to duplicate as closely as possible the human judgment of an administrator, to thereby provide a desired level of sensitivity in detecting anomalies (such that if a human administrator would deem the performance data to be anomalous, the analysis module 202 will likewise judge the data to be anomalous); and (b) to provide a desired level of responsiveness in its analysis. As to the question of sensitivity, it is generally desirable to select the parameters that will not result in a hair-trigger approach to detection (in which too many relatively minor spiking events are detected along with the truly significant events). As to the question of responsiveness, it is generally desirable to make the windows as short as possible, so as to provide an indication of anomalous results to the user as soon as possible, but not so short as to interfere with proper analysis.

To arrive at parameters which satisfy these multiple constraints, the training module 118 can examine several instances of CPU spiking behavior and iteratively generate analysis results using different permutations of the parameters discussed above. The training module 118 can then select the permutation of parameters which produces the desired analysis results, while also producing satisfactory performance in terms of sensitivity and responsiveness. In one exemplary approach, the training module 118 can first attempt to attain a desired level of sensitivity (e.g., the optimum sensitivity). Then, the training module 118 can attempt to attain a desired level of responsiveness (e.g., the fastest response time) while still achieving the desired level of sensitivity. Other parameter-derivation approaches can be governed by different tradeoffs between sensitivity and responsiveness. In another case, an administrator can custom-define a desired tradeoff between sensitivity and responsiveness. For example, an administrator may specify that he or she is willing to receive suboptimum sensitivity in response to being notified of possible anomalies on a more frequent basis or less frequent basis.

Returning to the discussion of the analysis modules, the second analysis module 204 can use any type of algorithm to detect a deviation from a constant state of operation. In one case, the second analysis module 204 can compute a running least-squares best-fit line over the last n amount of time (defining a detection window) and compare the slope of that line to a prescribed threshold. The analysis module 204 can identify an anomaly if the slope deviates from the prescribed constant behavior by more than the prescribed threshold amount. For example, the second analysis module 204 can register an anomaly if a memory counter provides data which indicates an increase of n Kbytes/second. The parameters used by analysis module 204 to perform its computations may include: a size of the detection window; and a threshold level used to determine whether there is an anomaly.

The third analysis module 206 can detect a deviation from a preferred non-zero rate trend. The third analysis module 206 can use a type of algorithm that is similar to that employed by the first analysis module 202 or the second analysis module 204. For instance, in one implementation, the third analysis module 206 can compute a first slope over a small window and a second slope over a larger window. The third analysis module 206 can then compare the first slope to the second slope; if they vary by more than a prescribed amount, the third analysis module can identify an anomalous result. The parameters used by analysis module 206 to perform its computations may include: a size of the short window; a size of the long window; and a threshold used to determine whether there is an anomaly.

Still other types of analysis modules based on different types of detection paradigms can be employed in the data analysis module 222.

A.3. Exemplary Analysis Output Module

Figure 4:
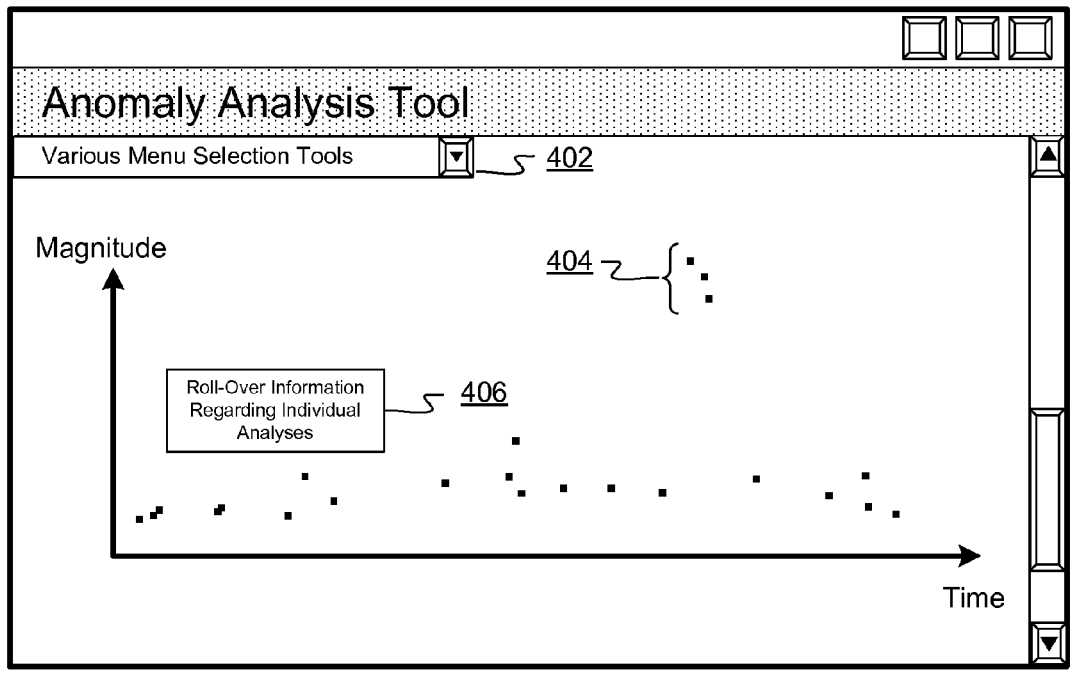
FIGS. 4-6 show exemplary user interface presentations that can display the output of the anomaly analysis system of FIG. 1.
Figure 5:
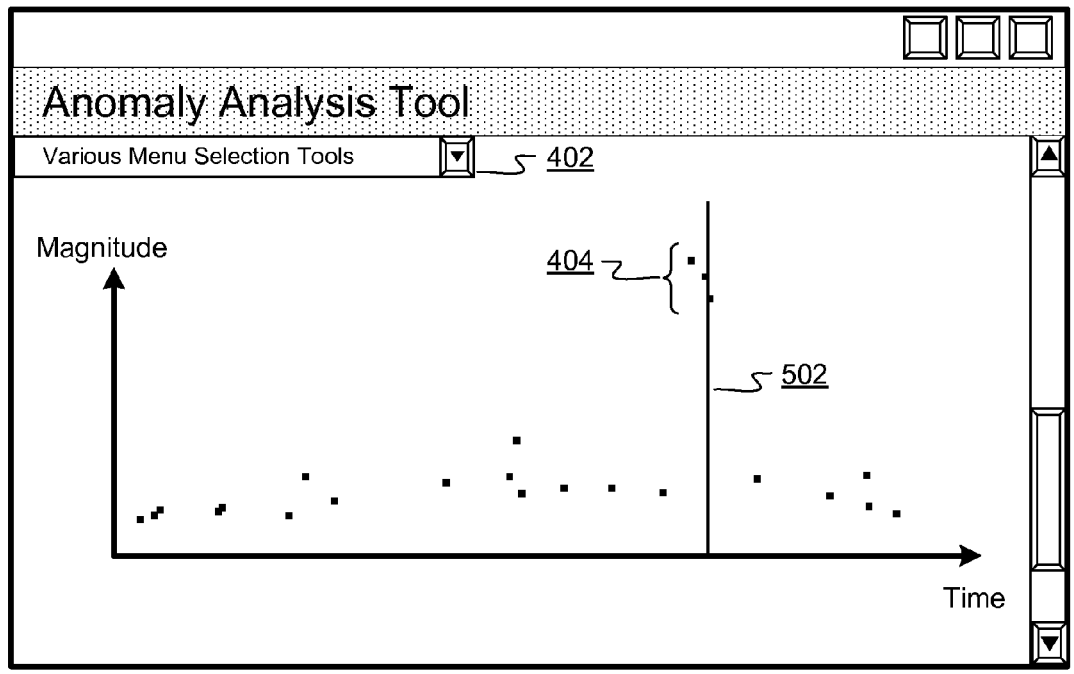
Figure 6:
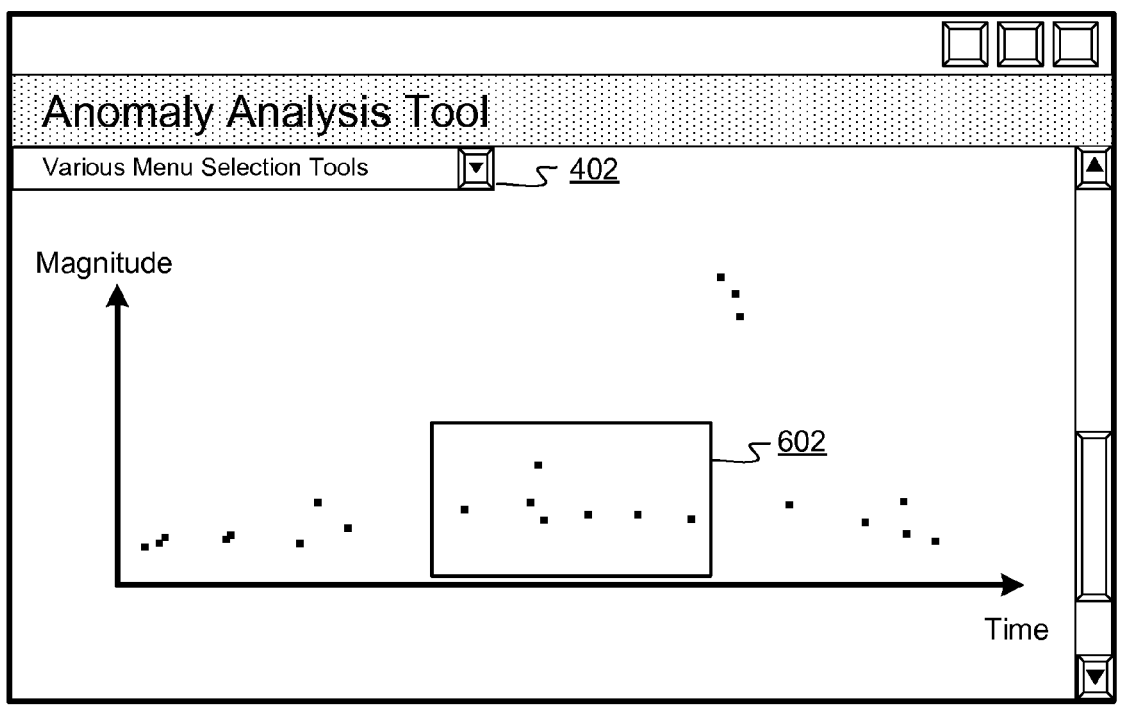

FIGS. 4-6 show exemplary user interface (UI) presentations that can be generated by the analysis output module 134.

The analysis output module 134 allows an administrator to make selections that govern various aspects of the analysis that is performed and the UI presentations that are generated. The analysis output module 134 allows such selections to be made through any variety of input controls. For instance, the UI presentation shown in FIGS. 4-6 includes a menu-type control 402. This control 402 allows an administrator to select among different display mode options.

The administrator can make other types of configuration selections. For instance, in one exemplary case, an administrator can instruct the analysis output module 134 to create a UI presentation that is restricted to a specific type of counter. More specifically, a user can ask the analysis output module 134 to display output results for an entire class of counters or a subset of user-selected counters within this class. Generally, an administrator may wish to provide results for a specific type of counter to more readily reveal patterns in counter behavior. In an alternative case (not shown), an administrator may instruct the analysis output module 134 to generate a UI presentation that provides results for plural types of counters.

According to another example, an administrator can select a scale and type of units used in graphing results.

According to another exemplary feature, an administrator can instruct the analysis output module 134 to compare multiple runs of the data processing environment 104 on a same graph.

According to another exemplary feature, an administrator can instruct the analysis output module 134 to show only the top n anomalous counters in the data processing environment 104. The administrator can also select the value of n. In one case, the administrator can ask the analysis output module 134 to select the n worst anomalies within a single counter class (e.g., counters relating to CPU spiking). In another case, the administrator can ask the output module 134 to make a cross-counter comparison to select the worst n counters of any class. The analysis output module 134 can make this cross-counter analysis by consulting a rules database. The rules in this database can identify the criteria by which an anomaly associated with a first kind of counter can be considered worse (or better than) an anomaly associated with a second kind of counter, etc.

Turning now to the specific UI presentations shown in FIGS. 4-6, in this example, the administrator has asked the analysis output module 134 to graph the spiking behavior revealed by counters that monitor CPU performance. The graph identifies the severity of CPU spiking on its vertical axis and time on its horizontal axis. The points in the graph represent analysis generated for different respective CPU performance counters. In other words, the points may represent the analysis output of the spiking analysis module 202 described above. The counters, in turn, may be associated with different respective server machines. A cluster 404 of points that shares an elevated spiking level may be indicative of an anomalous CPU event in the operation of the data processing environment 104.

The UI presentations shown in FIGS. 4-6 can include various features. Beginning with FIG. 4, an administrator may "roll over" a certain part of the graph with a graphical pointing device (e.g., a mouse device). In response, the analysis output module 134 can display a pop-up panel 406 or like message. This supplemental presentation provides additional information regarding the analysis, such as the name of a counter associated with a particular part of the graph, etc. An administrator can also click on any point in the graph to receive additional information associated with this point, such as the original performance data associated with the point, optionally presented in spreadsheet (tabular) form.

FIG. 5 shows a correlation feature that may be optionally invoked. According to this feature, an administrator can select a particular juncture in the timeline of the graph. In response, the analysis output module 134 can draw a line 502 or like visual aid at this juncture. This line 502 allows the administrator to more readily visually correlate the events which occur at or near the selected time.

FIG. 6 shows a zoom feature that may be optionally invoked. According to this feature, an administrator can draw a box 602 within the graph. This graph marks a part of the graph that the administrator wants to further investigate. In response to this selection, the analysis output module 134 can redraw the graph to emphasize the information enclosed by the box 602.

According to another feature (not shown), an administrator can use the UI presentation as a portal to invoke an editing interface. The administrator can manually adjust counter sensitivities, parameter values, and so forth, through this editing interface.

A.4. Exemplary Processing Functionality

Figure 7:
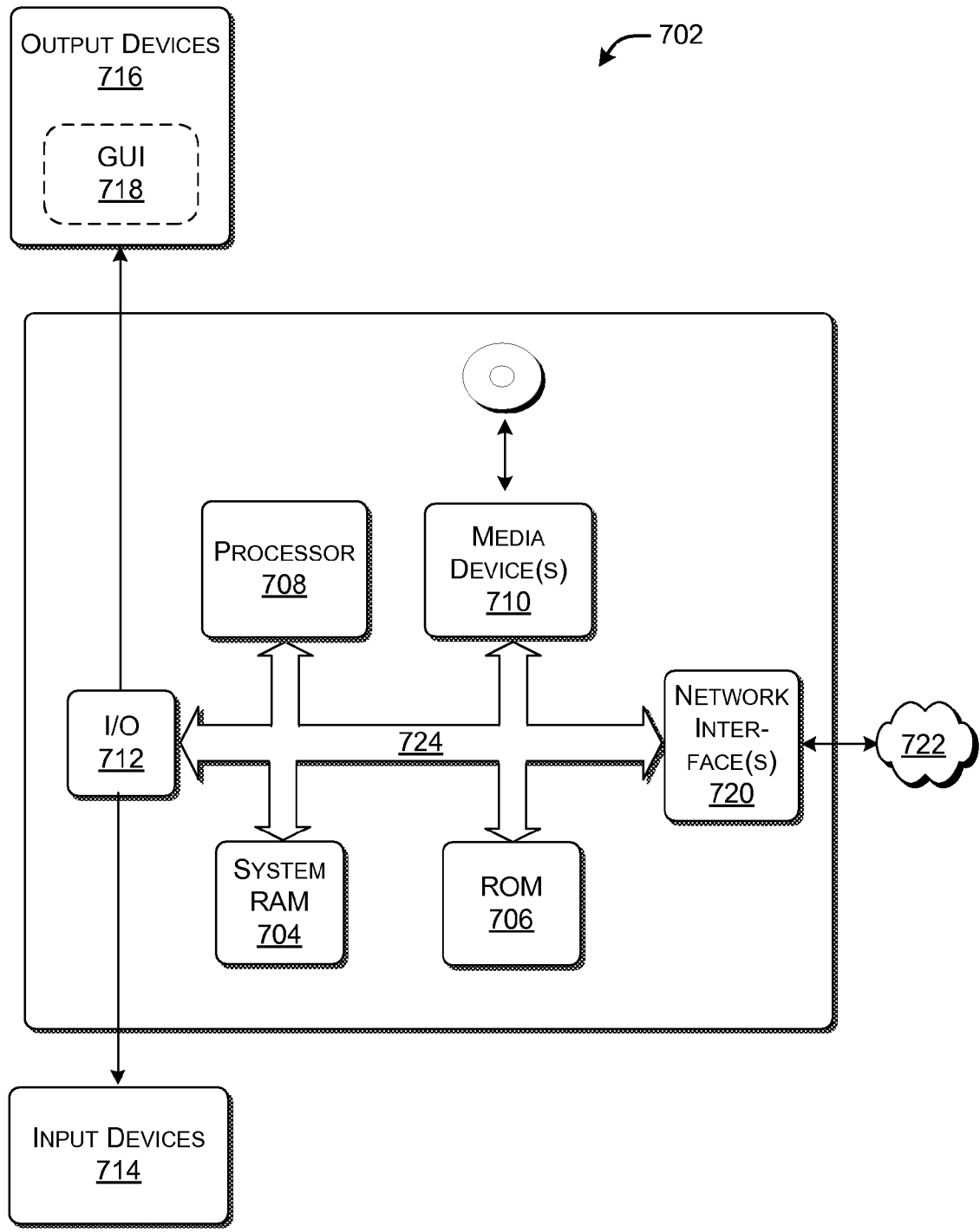
FIG. 7 shows exemplary processing functionality for implementing any aspect of the features shown in FIG. 1.

Various aspects of the components shown in FIG. 1 can be implemented by information processing equipment, including any combination of software, firmware, and hardware. FIG. 7 sets forth exemplary processing functionality 702 that can be used to implement any aspect of these components. For example, in the cases in which the AAS 102 is implemented by a computer machine, the data processing functionality 702 can be used to implement this computer machine. The processing functionality 702 can also generally represent any component within the data processing environment 104, such as a server computer, and so forth.

The processing functionality 702 can include various volatile and non-volatile memory, such as RAM 704 and ROM 706, as well as one or more central processing units (CPUs) 708. The processing functionality 702 can perform various operations identified above when the CPU 708 executes instructions that are maintained by memory (e.g., 704, 706, or elsewhere). The processing functionality 702 also optionally includes various media devices 710, such as a hard disk module, an optical disk module, and so forth.

The processing functionality 702 also includes an input/output module 712 for receiving various inputs from the user (via input devices 714), and for providing various outputs to the user (via output devices 716). A particular output device may include a display apparatus which is used to present the types of presentations described above, e.g., via a graphical user interface (GUI) 718. The processing functionality 702 can also include one or more network interfaces 720 for exchanging data with other devices via one or more communication conduits 722. One or more communication buses 724 communicatively couple the above-described components together.

The communication conduits 722 can be implemented in different ways to suit different technical and commercial environments. For instance, the communication conduits 722 can include any kind of network (or combination of networks), such as a wide area network (e.g., the Internet), an intranet, Digital Subscriber Line (DSL) network infrastructure, point-to-point coupling infrastructure, and so on. In the case where one or more digital networks are used to exchange information, the communication conduits 722 can include various hardwired and/or wireless links, routers, gateways, name servers, and so on.

B. Exemplary Procedure

Figure 8:
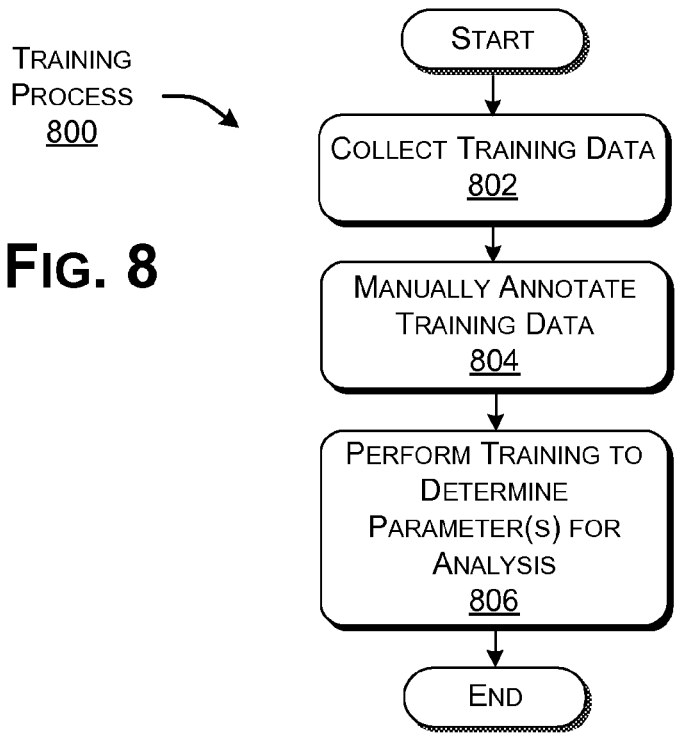
FIG. 8 shows an exemplary procedure for deriving parameter information in a training operation, which may be performed by the anomaly analysis system of FIG. 1.
Figure 9:
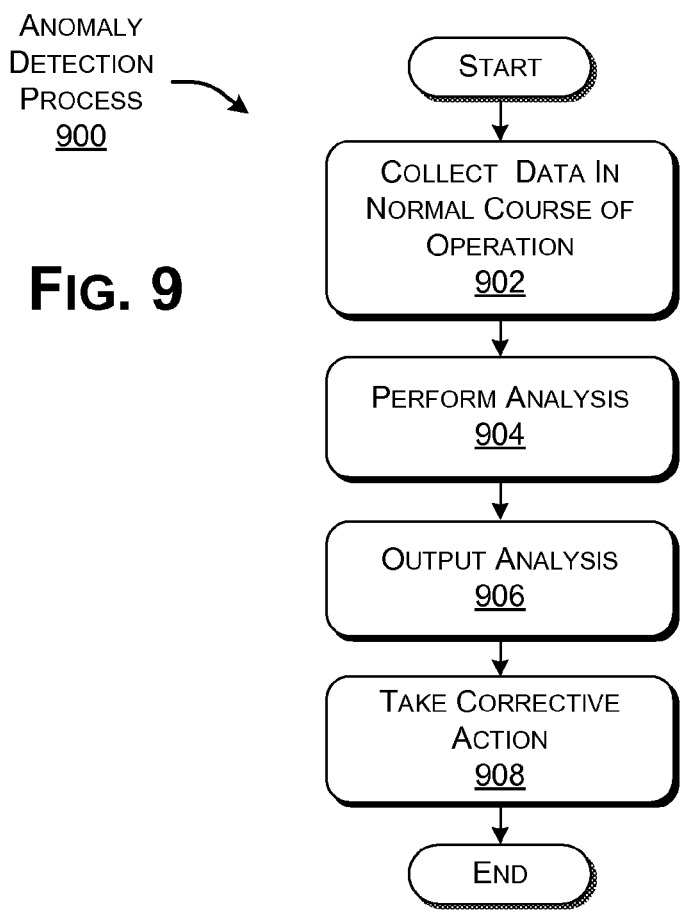
FIG. 9 shows an exemplary procedure for detecting anomalies, which may be performed by the anomaly analysis system of FIG. 1.

FIGS. 8 and 9 show procedures (800, 900) which explain the operation of the AAS 102 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth in Section A, Section B serves principally as a review of those functions.

FIG. 8 shows a procedure 800 that explains the training phase of the detection operation performed by the AAS 102.

In operation 802, the AAS 102 collects training performance data. As described above, the training performance data can reflect performance data that is known to have actual anomalies.

In operation 804, a human user can examine the training performance data. Based on his or her expertise, the human user can make a judgment as to whether this data reveals anomalies. At this point, the human user can also add hint information (if this hint information is not already present in the hint store 120), or modify inaccurate or incomplete existing hint information. As described above, the hint information identifies the characteristic modes of anomalous behavior exhibited by different counter types.

In operation 806, the training module 118 can derive parameter information based on the training performance data, the judgments of the human administrator, and the hint data. More specifically, the training process derives the parameters to duplicate as closely as possible the judgment of the human analyst (e.g., to provide a desired degree of sensitivity), and, at the same time, provide a desired degree of responsiveness.

FIG. 9 shows a procedure 900 for performing detection using operational performance data, based on the parameter information provided by procedure 800.

In operation 902, the AAS 102 collects the operational performance data. There are no preconceptions about this data; it may or may not reveal erroneous events.

In operation 904, the data analysis module 124 analyzes the performance data using one or more of the analysis modules and associated parameter information, as guided by the hint information.

In operation 906, the data analysis module 124 outputs the results of its analysis for storage in the output store(s) 132. The analysis output 132 can convey these results to a user in various forms, such as the graphical form shown in FIGS. 6-8.

In operation 908, the mitigation module 136 can assist the user in taking action to eliminate or reduce the severity of any anomaly detected by the data analysis module 124. Or the mitigation module 136 can automatically take corrective action without human involvement or without substantial human involvement.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method for detecting anomalies in a data processing environment, the computerized method comprising:

receiving training performance data from a counter of the data processing environment, wherein the counter records operational performance data;

receiving an annotation that identifies an anomalous instance in the training performance data and a type of anomaly to thereby provide annotation data;

receiving hint information from the user and storing the hint information in a hint store;

deriving parameter information based on the training performance data, the hint information and annotation data by computing a size of a short window, computing a size of a long window, determining whether there is an anomaly by comparing a ratio of the size of the short window to the size of the long window against an anomaly threshold, and selecting the size of the short window and the size of the long window when the comparing indicates an anomaly, wherein the short window and the long window are time intervals;

receiving operational performance data from the counter of the data processing environment;

receiving the hint information from the hint store, the hint information indicating a type of the counter which produced the operational performance data and a failure mode associated with the counter, which, in turn, identifies the type of behavior considered normal and anomalous for the counter;

analyzing the operational performance data based on the parameter information by using the selected size of the short window and the selected size of the long window and the anomaly threshold to search for anomalies in the operational performance data;

based on the hint information, identifying a type of source of the operational performance data, a type of performance counter, the failure mode associated with the performance counter and a respective characteristic of the type of sources of the training performance data and operational performance data; and determining whether the operational performance data reveals the occurrence of at least one anomaly in the data processing environment, wherein the analyzing incorporates, by virtue of the parameter information, a desired degree of both sensitivity and responsiveness, wherein responsiveness is dependent on the size of the short window and the size of the long window, and wherein sensitivity determines how inclusive the operational performance data is in defining the anomalies.

2. The computerized method of claim 1, wherein the data processing environment includes plural computer server machines.

3. The computerized method of claim 1, wherein the training performance data and the operational performance data are obtained from plural performance counters associated with the data processing environment.

4. The computerized method of claim 1, wherein the analyzing employs a plurality of types of detection algorithms that investigate the operational performance data for respective different types of anomalies.

5. The computerized method of claim 4, wherein the plural types of detection algorithms include:
   a first detection algorithm that investigates the operational performance data for undesirable spikes;
   a second detection algorithm that investigates the operational performance data for undesirable deviations from a substantially constant state; and
   a third detection algorithm that investigates the operational performance data for undesirable deviations from a preferred trend.

6. The computerized method of claim 1, wherein the analyzing employs a detection algorithm that:
   computes a value based on a window of the operational performance data; and
   compares the value with a prescribed threshold to determine whether the operational performance data reveals an anomaly.

7. The computerized method of claim 6, wherein one or more of the following constitutes parameter information obtained from the deriving:
   a size of the window; or
   the threshold.

8. The computerized method of claim 1, further comprising generating a graphical presentation which reveals the occurrence of said at least one anomaly in the data processing environment.

9. The computerized method of claim 8, further comprising providing an indication on the graphical presentation of correlated events.

10. The computerized method of claim 8, further comprising expanding a selected region within the graphical presentation upon request.

11. One or more machine-readable media containing machine-readable instructions for implementing the computerized method of claim 1.

12. The computerized method of claim 1, wherein the deriving of the parameter information is also based on the hint information received from the hint store.

13. The computerized method of claim 1, wherein the hint information identifies information regarding performance of a performance counter involved in generating operational performance data, and wherein the hint information assists in selecting one or more analysis modules that are suited for analyzing a specific type of the operational performance data.

14. The computerized method of claim 1, wherein analyzing includes mitigating an anomaly by taking a prescribed action when the anomaly occurs multiple times in a scan interval.

15. A method for detecting anomalies in operational performance data, the method comprising:
   recording training performance data and operational performance data by a performance counter of a processing environment;
   receiving training performance data from the performance counter, the training performance data having known anomalies;
   receiving annotation data indicating each of the known anomalies in the training performance data and a type of anomaly;
   deriving a size of a short window and a size of a long window based on the training performance data, hint information and annotation data, the size of the short window and the size of the long window being derived by iteratively selecting the size of the short window and the size of the long window and comparing the ratio of these sizes to an anomaly threshold until a desired degree of sensitivity and responsiveness of anomaly detection is obtained, wherein the short window and the long window are time intervals;
   receiving the hint information from a hint store, the hint information indicating a type of performance counter which recorded the operational performance data and a failure mode associated with the performance counter, which, in turn, indicates the type of behavior considered normal and anomalous for the performance counter;
   receiving operational performance data from the performance counter of the processing environment;
   analyzing the operational performance data based on the derived size of the short window and the derived size of the long window, the hint information, the annotation data and the anomaly threshold, wherein the analyzing incorporates, by virtue of a set of parameter information, the desired degree of both sensitivity and responsiveness, wherein the set of parameter information is based on the training performance data, an administrator input and the hint information, and wherein responsiveness is dependent on the derived size of the short window and the derived size of the long window, and further wherein sensitivity determines how inclusive the operational performance data is in defining the anomalies; and
   determining from the operational performance data the occurrence of an anomaly in the operational performance data.

16. The computerized method of claim 1, wherein receiving the hint information comprises adding hint information to existing hint information.

17. The computerized method of claim 1, wherein the analyzing employs a detection algorithm that:
   computes a first value based on a first window of the operational performance data;
   computes a second value based on a second window of the operational performance data; and
   compares the first value with the second value to determine whether the operational performance data reveals an anomaly.

18. The computerized method of claim 17, wherein one or more of the following constitutes parameter information obtained from the deriving:
   a size of the first window; or
   a size of the second window.

* * * * *